United States Patent [19]

Scott

[11] Patent Number: 5,602,869
[45] Date of Patent: Feb. 11, 1997

[54] ADAPTIVE TRANSMIT LEVELS FOR MODEMS OPERATING OVER CELLULAR

[75] Inventor: Robert E. Scott, Indian Rocks Beach, Fla.

[73] Assignee: Paradyne Corporation, Largo, Fla.

[21] Appl. No.: 619,149

[22] Filed: Mar. 21, 1996

Related U.S. Application Data

[63] Continuation of Ser. No. 137,542, Oct. 18, 1993, abandoned.

[51] Int. Cl.$^6$ ............................................. H04Q 7/32
[52] U.S. Cl. ........................... 375/222; 379/59; 379/410; 370/286; 455/33.1
[58] Field of Search ................................. 379/59, 60, 63, 379/410, 93, 97, 98; 455/33.1, 54.1, 284, 69, 67.1, 127, 126; 370/6, 32, 32.1, 17; 375/222, 219

[56]   References Cited

U.S. PATENT DOCUMENTS

| | | | |
|---|---|---|---|
| 4,481,622 | 11/1984 | Cheng et al. | 370/32 |
| 4,554,579 | 11/1985 | Citta | 358/86 |
| 4,782,525 | 11/1988 | Sylvan et al. | 379/410 |
| 4,816,825 | 3/1989 | Chan et al. | 340/825 |
| 4,937,851 | 6/1990 | Lynch et al. | 379/6 |
| 4,989,243 | 1/1991 | Choi | 370/32.1 |
| 5,155,590 | 10/1992 | Beyers, II et al. | 358/86 |
| 5,177,734 | 1/1993 | Cummiskey et al. | 370/32.1 |
| 5,214,637 | 5/1993 | Sridhar et al. | 375/222 X |
| 5,241,565 | 8/1993 | Kloc et al. | 375/222 X |
| 5,257,408 | 10/1993 | Olson et al. | 455/54.1 |
| 5,289,459 | 2/1994 | Brownlie | 370/17 |
| 5,353,348 | 10/1994 | Sendyk et al. | 379/410 |
| 5,386,589 | 1/1995 | Kanai | 455/33.1 |

*Primary Examiner*—Curtis Kuntz
*Assistant Examiner*—William G. Trost
*Attorney, Agent, or Firm*—Thomas, Kayden, Horstemeyer & Risley

[57]    ABSTRACT

The strength of a local echo signal is used to dynamically adjust the transmit signal level of a modem. In particular, the modem provides a transmit signal to a local loop of a public switched telephone network (PSTN). This local loop couples the modem to, for example, a central office. The amount of reflected energy from the central office, i.e., echo, received by the modem is inversely proportional to the amount of energy actually getting through to the central office. If the magnitude of the local echo signal is small, which indicates that most of the transmit signal energy is reaching the equipment of the central office, then the signal level of the transmit signal is lowered. Conversely, if the magnitude of the local echo signal is large, which indicates that most of the transmit signal energy is being back reflected from the central office, then the signal level of the transmit signal is raised. This use of the local echo signal to adjust the transmit signal level helps avoid situations where the signal level of the modem may be either "too hot" or "too cold," either of which may result in a concomitant loss of data through the communications system.

13 Claims, 3 Drawing Sheets

ADAPTIVE TRANSMIT LEVELS FOR MODEMS OPERATING OVER CELLULAR

This application is a continuation of application Ser. No. 08/137,542, filed on Oct. 18, 1993, now abandoned.

BACKGROUND OF THE INVENTION

The present invention relates to data communications equipment and, more particularly, to the adjustment of the transmit signal level of the data communications equipment.

The ability of data communications equipment to dynamically adjust the signal level, or amplitude, of a transmitted signal in order to compensate for changes in the transfer characteristics of a communications channel is well known in the art. Generally, the data communications equipment, or endpoints, of a communications network communicate to each other via a protocol that allows for the adjustment of a transmitted signal level of a particular endpoint. For example, in cable television (CATV), U.S. Pat. No. 5,155,590, issued Oct. 13, 1992 to Beyers II, et al., and U.S. Pat. No. 4,816,825, issued Mar. 28, 1989, to Chan et al., describe techniques that allow the CATV head-end to dynamically, or automatically, adjust the signal level from any downstream CATV station. Similarly, U.S. Pat. No. 4,554,579 issued Nov. 19, 1985 to Citta describes a technique that allows a network controller of a local area network to dynamically adjust a signal level from a data communications equipment that is coupled to the local area network. Both of these approaches require that a data connection exist between the endpoints of any network.

In addition, there is also a need in some situations to automatically adjust a signal level because of the type of equipment that receives the signal. For example, in the area of cellular data communications, a cellular modem provides a data signal to a cellular transceiver, which further modulates the data signal for transmission over a cellular telephone network to an answering modem that is located somewhere within the Public Switched Telephone Network (PSTN). Unfortunately, the signal level requirements of a cellular transceiver may vary from manufacturer to manufacturer. As a result, current cellular modems, e.g., a modem that supports the MNP-10 protocol (an MNP-10 modem), use an adaptive transmit routine to automatically adjust the transmit signal level of the cellular modem to match the signal level provided by the cellular transceiver. Like the above-mentioned U.S. Patents, in order to perform this adaptive adjustment, an originating cellular modem must first establish a data connection with a PSTN modem that supports the same protocol as the cellular modem. This allows the cellular modem to receive special "modem-only" packets, i.e., packets that are not provided to data terminal equipment but are used to transmit information as between the cellular modem and the PSTN modem. In this case, the cellular modem dynamically adjusts the transmit signal level by monitoring a predefined modem-only packet transmitted by the PSTN modem.

However, there are some problems associated with the above-mentioned type of automatic adjustment that affect the user of the equipment. For example, if either modem does not support the same protocol, then no adjustment of the transmit signal level by the either modem takes place. Unfortunately, this may result in one modem applying a default signal that is too "hot" to the respective communications channel. A "hot" signal is one where the value of the transmit signal level is so high that the likelihood of some type of distortion in the transmitted signal increases. For example, if a modem is coupled via a short local loop to the PSTN, the transmit signal level of the modem may be too hot with the result that processing by the PSTN may then "clip" the data signal. This clipping introduces errors into the transmitted data stream.

The co-pending, commonly assigned U.S. patent application of R. E. Scott entitled "Fixed Transmit Levels for Modems Operating Over Cellular," Ser. No. 08/096,282, filed on Jul. 26, 1993, discloses a technique for overcoming some of the above-mentioned shortcomings. This approach allows a user to manually adjust, i.e., control, the transmit signal level of a cellular modem, or a PSTN modem, and avoid the above-mentioned problems. As a result, there is no requirement that a data connection must exist between the modem endpoints, or that the modem endpoints must support the same protocol. Consequently, the user can independently adjust either modem's transmitted signal level so that it is not too hot and, therefore, no clipping of the transmitted data signal takes place. In addition, connect time is reduced since there is no transmission of predefined modem-only packets between the modem endpoints.

SUMMARY OF THE INVENTION

Although the above-mentioned Scott patent application discloses an advantageous technique for adjusting the transmit signal level of a modem, I have discovered another alternative, and also advantageous, technique for adjusting the transmit signal level. Specifically, the transmit signal level of the modem is varied as a function of the received echo signal in the modem.

In an embodiment of the invention, a modem provides a transmit signal to a local loop of a PSTN. This local loop couples the modem to, for example, a central office of the PSTN. The amount of energy from the transmit signal actually getting through to the central office is inversely proportional to the size of the signal reflected back to the modem, i.e., the local echo signal. If the magnitude of the local echo signal is small, which indicates that most of the transmit signal energy is getting through to the central office, then the signal level of the transmit signal is lowered. Conversely, if the magnitude of the local echo signal is large, which indicates that most of the transmit signal energy is being reflected back from the central office, then the signal level of the transmit signal is raised. This use of the local echo signal to adjust the transmit signal level helps avoid situations where the signal level of the modem may be either "too hot" or "too cold," either of which may result in a concomitant loss of data through the communications system.

DETAILED DESCRIPTION

Figure 1:
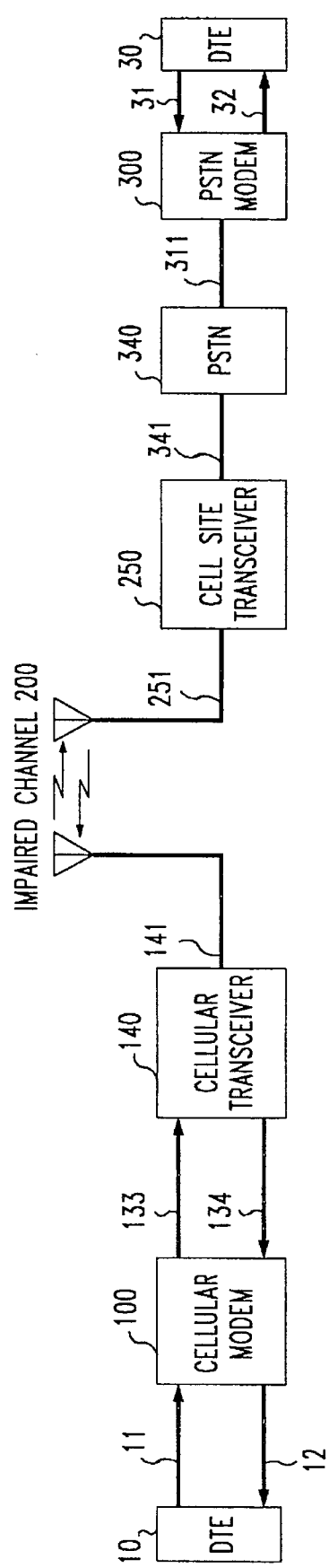
FIG. 1 is a block diagram of a mobile data communications system that includes a PSTN modem embodying the principles of the invention.

FIG. 1 shows a block diagram of a mobile data communications system that includes a PSTN modem, which embodies the inventive concepts of this invention. As shown, cellular modem 100 is coupled to cellular transceiver 140 for transmitting to, and receiving information from, PSTN modem 300 via cell site transceiver 250, impaired channel 200, and PSTN 340. The latter includes a Mobile Telecommunications Switching Office (MTSO), etc., for establishing a PSTN connection to PSTN modem 300. Both cellular modem 100 and PSTN modem 300 are also coupled to respective data terminal equipment 10 and 30.

Generally speaking, the following is a brief overview of the operation of the mobile data communications system. A data signal for transmission to PSTN modem 300 is applied to cellular modem 100, via line 11, from data terminal equipment 10. Cellular modem 100 modulates this data signal as is known in the art to provide a modem signal to cellular transceiver 140. Although not necessary to the inventive concept, it is assumed for the purposes of this example that the modem signal is compatible with International Telegraph and Telephone Consulative Committee (CCITT) standard V.32bis. Cellular transceiver 140 further modulates this transmission signal onto a predefined cellular carrier to provide a cellular data signal to antenna 141. Cell site transceiver 250 receives the cellular data signal via antenna 251 and provides a received modem signal via PSTN 340 to PSTN modem 300. The latter demodulates the received modem signal to provide a received data signal to DTE 30. Ideally, this received data signal is identical to the data signal provided by DTE 10 to cellular modem 100. Similarly, transmission of information from DTE 30 to DTE 10 occurs in a like fashion.

Typically in the residential sector, a full-duplex modem is used to deliver data services over a single communications channel, which is typically a twisted pair of telephone wires. In order to accommodate full-duplex operation, signal energies from both directions of transmission must be superimposed on this single communications channel simultaneously. As a result, some signal energy from each direction of transmission inevitably leaks through to the opposite direction path. This cross-path leakage allows some of a modem's transmitted signal to appear at the input of its own receiver. This undesired leaked-through signal is often referred to as "echo." An echo signal can seriously degrade a modem receiver's performance if not mitigated. Although the echo cannot simply be filtered, it can be reduced to acceptable levels through the use of an adaptive filter that is configured as an "echo canceler" within the modem. The echo canceler adaptively synthesizes a replica of the echo, which is then subtracted from the received signal, leaving a substantially echo-free signal. This echo-compensated signal is applied to the modem's data receiver. The echo canceler technique has been so successful that it now is a standard component in most full-duplex high-speed modems.

Figure 2:
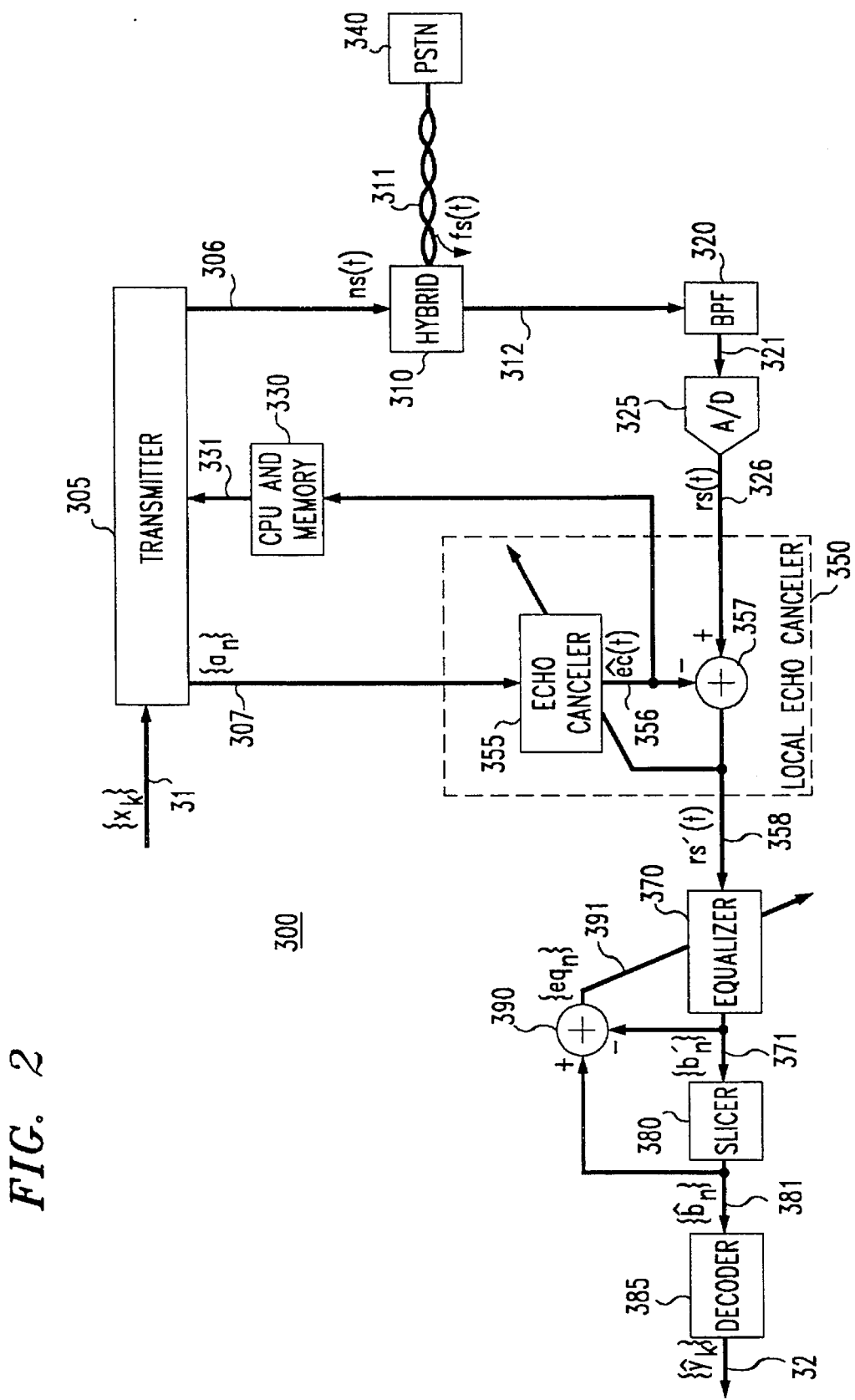
FIG. 2 is a block diagram of PSTN modem 300 embodying the principles of the invention.

In order to facilitate understanding of the inventive concept reference should now be made to FIG. 2, which represents an illustrative block diagram of PSTN 300. Except for the inventive concept (discussed below), the structure of PSTN modem 300 as illustrated in FIG. 2 is representative of prior art echo-canceling modems and the operation of the various components is well-known.

A binary input data sequence $\{x_k\}$ is provided by DTE 30 to modem 300 on line 31. This input data sequence is processed by transmitter 305 to form a near-end transmitted signal, ns(t). Illustratively, near-end transmitted signal, ns(t), represents a quadrature amplitude modulated (QAM) signal. The near-end transmitted signal, ns(t), is provided by hybrid 310 to channel 311, which is a twisted-pair, or two-wire loop, that is coupled to a telephone central office (not shown) within PSTN 340.

Transmitter 305 is under the control of CPU and memory 330, which is a micro-processor based central processing unit and associated memory for storing program data. It is assumed that transmitter 305 includes an encoder, shaping filter, digital to analog converter, etc., for processing and modulating the input data sequence on line 31 to provide the QAM signal, ns(t), on line 306. As part of this processing of the input data sequence, transmitter 305 represents the input data sequence as a sequence of complex-valued symbols $\{a_n\}$, at nominal rate 1/T symbols per second. (This processing may also include scrambling, redundancy and other forms of encoding.) As can be seen from FIG. 2, this input data sequence is also used by local echo canceler 350 (described below).

Turning now to the other direction of communication, an analog line signal, fs(t), transmitted from a far modem, e.g., cellular modem 100, is received by hybrid 310 and is directed to bandpass filter (BPF) 320. This signal is referred to as the "far-end data signal," and utilizes the same frequency band as the transmitted signal, ns(t), i.e., PSTN modem 300 is a full-duplex modem. Bandpass filter 320 removes energy outside the signal passband from the far-end data signal, which is then convened to digital form by analog-to-digital (A/D) converter 325 to form received signal rs(t).

The signal, fs(t), reaching the input of bandpass filter 320 is corrupted by so-called echo signals. Echo signals are typically introduced at each four-to-two wire conversion in the communications system. For example, hybrid 310, may itself be a source of an echo signal to the receiver of PSTN modem 300, as is the hybrid (not shown) at the opposite end of local loop 311 within PSTN 340. Today, there is usually little loss through the modem's own hybrid, consequently, it is assumed herein that the term "local echo" only refers to the echo signal reflected from PSTN 340. In what follows it will be appreciated that the invention applies independent of what other echoes may have to be canceled by the modem.

The local echo comprises transmit signal energy from PSTN modem 300 which was directed onto channel 311 in the first instance but was reflected back to the modem from PSTN 340 as the result of, for example, an impedance mismatch at a two-to-four wire conversion. The received signal, rs(t), provided by A/D converter 325, thus contains not only energy from the far-end data signal, but also local echo energy.

Accurate recovery of the data represented by the far-end data signal requires that the echo energy present in the samples on line 326 be removed. To this end, local echo canceler 350 processes received signal rs(t). Local echo canceler 350 comprises echo canceler 355 and adder 357. As is known in the art, it is assumed that echo canceler 355 compensates for any group delay or frequency translation caused by the length of the local loop. Echo canceler 355 forms a local-echo estimate, $\hat{ec}(t)$, which approximates the actual local echo signal present in received signal rs(t). Echo canceler 355 is essentially a filter whose transfer function is adaptively determined so as to emulate the "echo path," i.e., all filtering operations encountered by the locally transmitted symbol sequence $\{a_n\}$ from transmitter 305 through A/D converter 325. At adder 357, $\hat{ec}(t)$ is subtracted from rs(t) so as to produce a substantially echo-free signal, rs'(t). Thus, rs'(t) consists primarily of the far-end signal, plus any noise introduced by the channel and the various receiver elements (e.g., quantization error introduced by analog-to-digital converter 325).

Further processing of signal rs'(t) is performed by equalizer 370, which compensates for intersymbol interference introduced by channel 311, Equalizer 370 provides symbol sequence {b'$_n$} to slicer 380. The latter operates upon the sequence {b'$_n$} by quantizing the sequence {b'$_n$} to form estimated symbol sequence {b̂$_n$}. The latter is applied to adder 390 and decoder 385, which performs a symbol-to-bit mapping function and in turn yields an estimate, {ŷ$_k$}, of a binary sequence, {y$_k$}, transmitted by the far modem, i.e., cellular modem 100.

The amount of energy from the transmit signal of PSTN modem 300 actually getting through to the central office is inversely proportional to the size of the local echo signal. If the magnitude of the local echo signal is small, this indicates that most of the transmit signal energy is being received by the equipment in the central office. This is representative of a "non-lossy" local loop. Conversely, if the magnitude of the local echo signal is large, this indicates that most of the transmit signal energy is being reflected back from the central office. This is representative of a "lossy" local loop. Consequently, in a non-lossy local loop, the transmit signal level may be too high, i.e., too "hot." Conversely, in a lossy local loop, the transmit signal level may be too low, i.e., too "cold." Either event may result in an increase in the error rate of any data transmission. Therefore, and in accordance with the inventive concept, the strength of the local echo signal is used to dynamically adjust the transmit signal level of PSTN modem 300. This allows the transmit signal level to automatically increase if the transmit signal level is too cold, or automatically decrease if the transmit signal level is too hot.

Figure 3:
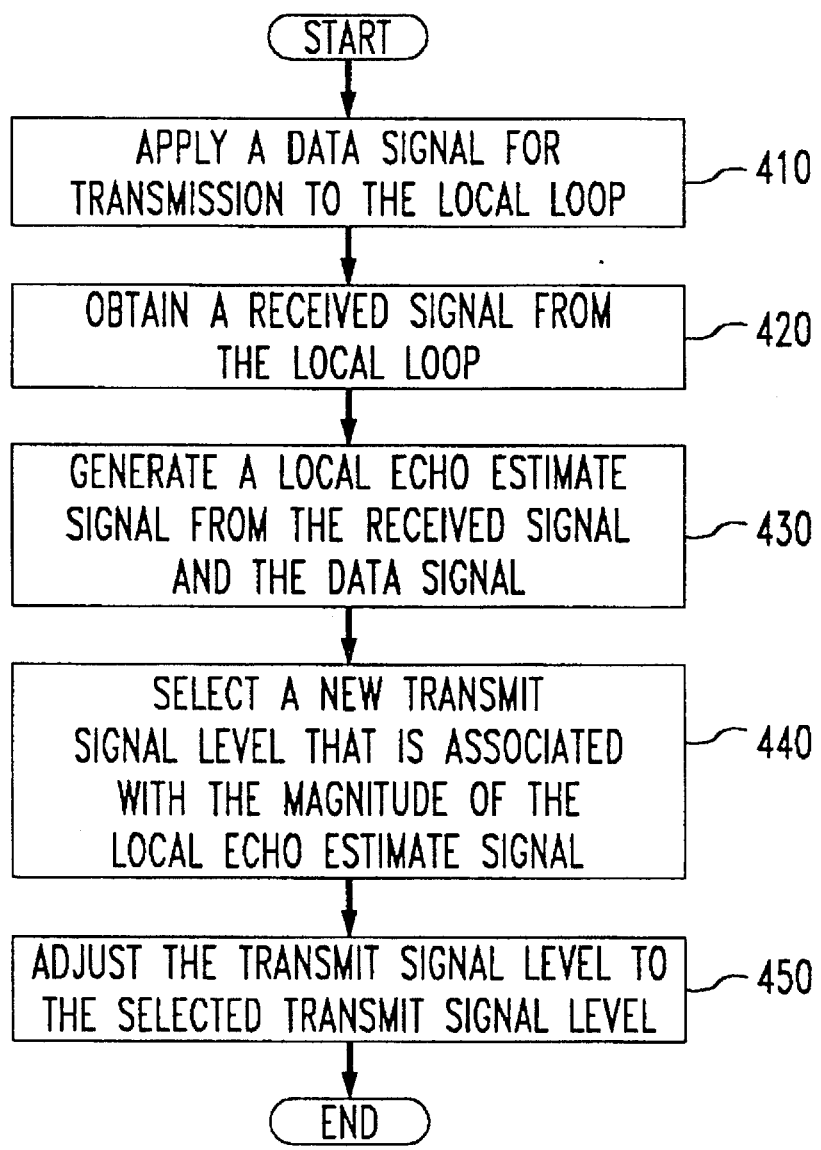
FIG. 3 is a flow diagram of an illustrative method for use in the modem of FIG. 2.

One measurement of the strength of the local echo signal is provided by the local echo estimate signal, ê (t). Reference should now be made to FIG. 3, which represents a first illustrative method implemented by PSTN modem 300.

In step 410, PSTN modem 300 applies data signal, ns(t), to the local loop. As described above, it is assumed this data signal is modulated according to CCITT standard V.32bis. Hybrid 310 of PSTN modem 300 provides the received signal, rs(t), in step 420. Local echo canceler 350 operates on this received signal to generate local echo estimate signal, ê (t) in step 430. From the magnitude of the local echo estimate signal, CPU 330 then calculates, or selects, a new transmit signal level in step 440.

In step 440, CPU 330 performs the following illustrative algorithm:

$$LEL(dBm)-CTL(dBm)-10\ dBm=NTL(dBm), \quad (1)$$

where, NTL is bounded within: $-10\ \text{dBm} \leq NTL \leq -21\ \text{dBm}$.

In equation (1), "LEL" is the magnitude of the local echo estimate signal, ê (t), "CTL" is the magnitude of transmit signal ns(t), and "NTL" is the new transmit signal level value for ns(t).

It should be noted that the above algorithm is simplistic in nature and that in reality the adjustment of the transmit signal level must be bounded as indicated. For example, if there is little, or no, local echo signal, then the local echo level approaches $-\infty$ in dBm. Consequently, the above algorithm, by itself, would suggest that the transmit level could be significantly lowered. In reality, I have determined empirically the lower bound for the transmit signal level to be $-21$ dBm. Similarly, if the local echo signal reflects most of the energy of the transmit signal, then the upper bound on the transmit signal level is $-10$ dBm. This is the maximum level mandated by FCC (Federal Communications Commission) requirements.

After selecting the transmit signal level value, CPU 330 adjusts the signal level of transmitter 305 to the new transmit signal level value via line 331. On the next iteration of the algorithm, this new transmit signal level value now becomes the current transmit signal level. Although CPU 330 keeps track of the current transmit signal level, at initialization I have determined that this value can begin at $-17$ dBm.

From the above description, it can be observed that PSTN modem 300 adaptively alters its own transmit signal level without requiring a compatible modem at the opposite endpoint. Indeed, it does not even require a data connection be established. For example, assuming that PSTN modem 300 is an originating modem, after dialing a telephone number and receiving an "off-hook" indication from PSTN 340, PSTN modem 300 will attempt a V.32bis training sequence with the far-end modem. As a consequence of transmitting this V.32bis training sequence to the far-end modem, hybrid 310 of PSTN modem 300 provides a received signal from the local loop in step 420 even if the far-end modem transmits no signal to PSTN modem 300. In this particular case, the received signal is only the echo of the V.32bis transmit sequence from PSTN 300. In other words, PSTN modem 300 adaptively changes the transmit signal level even if the opposite endpoint never replies to the V.32bis training sequence.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although described above in the context of a cellular data connection, this invention is applicable to any data communications channel, e.g., a data connection involving only PSTN endpoints, and other modulation schemes can also be used like V.32, etc. In addition, instead of performing the above-mentioned algorithm for adjusting the transmit signal level, a simple table look-up approach can be used by associating different values of the local echo signal with a transmit signal level. Also, although the invention is illustrated herein as being implemented with discrete functional building blocks, e.g., echo cancelers, transmitter, etc., the functions of any one or more of those building blocks can be carried out using one or more appropriate programmed processors, e.g., a digital signal processor.

I claim:

1. A method for adjusting a power level of an output signal provided by a modem, the method comprising the steps of:

transmitting the output signal to a communications channel;

receiving an echo of the output signal from the communications channel; and varying the power level of the output signal as a function of the received echo independent of signals received in an opposite modem endpoint during the transmission of said output signal.

2. The method of claim 1 wherein the step of varying includes the steps of:

measuring the magnitude of the echo; and changing the power level of the output signal as a function of the magnitude of the echo signal.

3. The method of claim 2 wherein the echo is the local echo signal of the output signal.

4. The method of claim 2 wherein the step of changing the power level is bounded by a predefined upper amplitude level value and a predefined lower amplitude level value.

5. A method for adjusting a signal level of an output signal provided by a modem, the method comprising the steps of:

transmitting a first data signal;

receiving a second signal;

echo canceling the second signal to provide an echo estimate signal of the first data signal; and changing the first data signal's transmit power level as a function of the echo estimate signal independent of signals received in an opposite modem endpoint during transmission of said first data signal.

6. The method of claim 5 wherein the step of changing includes the step of subtracting from the echo estimate signal a current amplitude level value and a predefined constant to provide a new amplitude level value for the first data signal.

7. Apparatus for adjusting a power level of an output signal provided by a modem, the apparatus comprising:

means for transmitting the output signal to a communications channel;

means for receiving an echo of the output signal from the communications channel; and means for varying the power level of the output signal as a function of the echo independent of signals received in an opposite modem endpoint during the transmission of said output signal.

8. The apparatus of claim 7 wherein the means for varying includes:

means for measuring the magnitude of the echo; and means for changing the power level of the output signal as a function of the magnitude of the echo signal.

9. The apparatus of claim 8 wherein the echo is the local echo signal of the output signal.

10. The apparatus of claim 8 wherein the means for changing bounds the power level between a predefined upper amplitude level value and a predefined lower amplitude level value.

11. Modem apparatus for adjusting a signal level of an output signal provided by the modem, the apparatus comprising:

means for transmitting a first data signal;

means for receiving a second data signal;

means for echo canceling the second data signal to provide an echo estimate signal of the first data signal; and means for changing the first data signal's transmit power level as a function of the echo estimate signal independent of signals received in an opposite modem endpoint during transmission of said first data signal.

12. The apparatus of claim 11 wherein the means for changing subtracts from the echo estimate signal a current amplitude level value and a predefined constant to provide a new amplitude level value for the first data signal.

13. Modem apparatus for adjusting a power level of an output signal provided by the modem during duplex communication, the apparatus comprising:

means for transmitting a first data signal;

means for receiving a second data signal transmitted from an opposite modem endpoint;

means for echo canceling the second data signal to provide an echo estimate signal of the first data signal; and CPU means for a) subtracting from the echo estimate signal a current signal level value and a predefined constant to provide a new signal level value, and b) changing a power level value of the first data signal to correspond to the new signal level value during transmission of the first data signal.

\* \* \* \* \*